United States Patent [19]

Robinson et al.

[11] 4,038,236

[45] July 26, 1977

[54] RESOL TYPE VARNISHES CONTAINING TAR ACIDS

[75] Inventors: Joseph Gordon Robinson, Winchcombe; Edward Aubrey Rogers, Worcester, both of England

[73] Assignee: Coal Industry (Patents) Limited, London, England

[21] Appl. No.: 643,914

[22] Filed: Dec. 23, 1975

[30] Foreign Application Priority Data

Jan. 15, 1975 United Kingdom ............... 01708/75

[51] Int. Cl.$^2$ ..................... C08G 14/06; C08G 14/12; C08G 14/14
[52] U.S. Cl. ........................ 260/32.8 R; 260/32.8 N; 260/53 R; 260/57 R; 260/59 R; 260/67 A; 428/531
[58] Field of Search ............... 260/57 R, 53 R, 67 A, 260/51 R, 59 R, 32.8 R, 32.8 N

[56] References Cited

U.S. PATENT DOCUMENTS

| | | | |
|---|---|---|---|
| 2,954,360 | 9/1960 | Krzikalla et al. | 260/57 R |
| 3,303,167 | 2/1967 | Kakiuchi et al. | 260/57 R X |
| 3,370,023 | 2/1968 | Huang et al. | 260/51 R |
| 3,993,851 | 11/1976 | Robinson et al. | 260/57 R X |

OTHER PUBLICATIONS

Chem. Abstracts, vol. 77, 1972, 62751u, Robinson et al.
Phenolic Resins, Whitehouse et al. p. 109.
Merck Index, 8th Ed. 1968, p. 590.
Encyclopedia of Chemical Technology, vol. 15, 1969, pp. 189–190, Kirk–Othmer.

*Primary Examiner*—Howard E. Schain
*Attorney, Agent, or Firm*—James C. Wray

[57] ABSTRACT

A thermosetting resol-type resin, particularly suitable in varnish form in a solvent for laminating, is produced by reacting a blend of a tar acid and a resinous product of reacting an oxygen-containing naphthalene-formaldehyde resin with a phenol, with formaldehyde in the presence of ammonia.

14 Claims, No Drawings

RESOL TYPE VARNISHES CONTAINING TAR ACIDS

This invention concerns resol-type resins and particularly concerns resol-type varnishes prepared from naphthalene-formaldehyde-phenol resins.

It is known to use resol-type varnishes in the production of laminates to make products which have high water resistance properties. Such laminates can conveniently be paper, cloth or fibre mat.

It has previously been proposed to improve the properties of phenolic resins by reacting a mixture of phenol and a tar acid of boiling range 230°–320° C with an aldehyde.

The present invention provides a thermosetting resol-type resin prepared by reacting a blend of a resinous reaction product, prepared by reacting an oxygen-containing naphthalene-formaldehyde resin with a phenol, and a tar acid, preferably of a boiling point range of 185°–220° C, with formaldehyde in the presence of ammonia.

The preparation of the oxygen-containing naphthalene-formaldehyde resin is known per se, and suitable resins for use in the present invention are those of oxygen content 4–16% by weight, preferably 8–10% by weight.

The phenol used may be selected from cresols, phenolic novolak resins, xylenol, resorcinol and, preferably, phenol itself. The ratio of phenol to the naphthalene-formaldehyde resin is suitably above 0.5 to 1 and is preferably 0.7–2.0 to 1 by weight, and reaction is preferably reacted at a temperature from 80° to 100° C. A catalyst, preferably p-toluene sulphonic acid, is preferably used. The reaction may effected in the presence of an organic solvent such as toluene, and preferably the rate of heat evolution is controlled by slow, partwise addition of resin to the phenol.

Preferably an aqueous solution of ammonia is used in the final step of the production of the resin of the invention, and preferably the formaldehyde is used in the form of formalin. The ratio by weight of tar acid to the resinous reaction product is suitably from 1–3 to 1.

The resin of the invention is thermosetting and may be used in solution as a laminating varnish. The preferred solvent for the preparation of such a laminating varnish is methyl isobutyl ketone, and preferably the varnish contains approximately 50% of the resin.

The following Examples illustrate the invention, and all parts and percentages are by weight unless otherwise indicated.

EXAMPLE 1

16.8 parts of paraformaldehyde '87' were added to 19.5 parts of 54% w/w sulphuric acid and the temperature raised to 80° C. At this stage, 25 parts of naphthalene were added and the temperature was raised to 103° C and held at this for 6½ hours.

At the end of the naphthalene resinification process 41 parts of toluene were added to dissolve the naphthalene formaldehyde resin and after a few minutes a surface active agent was added to break the emulsion. The acqueous acid layer then settled out within about 10 minutes and was run off. The naphthalene-formaldehyde resin solution was then washed with water and this was followed by a wash with dilute sodium carbonate solution. Finally, the resin solution was washed until pH 7.5.

The naphthalene-formaldehyde resin obtained had an oxygen content of 8.6% and a molecular weight of 520.

25 parts of the toluene solution of naphthalene-formaldehyde resin (which contained 10 parts of resin) were then added to 9.2 parts of phenol and 0.03 parts of toluene-p-sulphonic acid at 95° C. The rate of addition of the toluene solution of the naphthalene-formaldehyde resin to the phenol was adjusted so that the temperature rise did not exceed 5° C. In the process the naphthalene-formaldehyde resin reacted with the phenol to give phenolated naphthalene-formaldehyde resin and 37% combined phenol. After 2 hours reaction 3.7 parts of 0.88 ammonia were stirred in and this was followed by the addition of 26.4 parts of crude tar acid and 45.5 parts of formalin (40% w/v HCHO). The reactants were stirred at 95° C for 1½ hours after which sufficient methyl isobutyl ketone was added to give a varnish containing 50% resin. The aqueous layer was run off.

The crude tar acid employed was a mixture of phenols of the following composition:

|  | % w/w |
|---|---|
| phenol | 36.95 |
| o-cresol | 9.30 |
| m - & p-cresols | 33.23 |
| xylenols to 210° C | 4.65 |
| A.D.F. (American Duty Free) 210–230° C | 9.03 |
| High boiling tar acids | 2.78 |
| pitch | 1.82 |

This crude mixture was used instead of selecting purer cuts to obviate the need for a costly refining process. However, purer cuts might be used to advantage.

Typical laminated articles were prepared by drawing sheets of high absorbent Kraft paper through the varnish and passing the varnished sheets between rollers. The resin-treated paper was then pre-cured by heating at 135° C. for 2–6 minutes, thereby drying to a volatile content of from 2.5–5%. The dry varnished sheets were then compressed into laminates by heating at temperatures in the range 140°–180° C under a pressure of about $690 \times 10^4$ N/m$^2$. The laminates were characterised by measuring their resistance to water ingress and their electrical properties.

Typical Kraft paper laminate properties are shown below:

| Laminate | Pre-cure time (min) | Resin in laminate (%) | Water abs (mg) | (Power factor) Tan delta. | Dielectric constant |
|---|---|---|---|---|---|
| 1 | 3 | 52 | 43 | 0.026 | 3.6 |
| 2 | 3 | 54 | 34 | 0.028 | 4.2 |
| 3 | 3 | 55 | 43 | 0.029 | 4.2 |
| 4 | 3 | 51 | 28 | 0.024 | 4.5 |

The optimum conditions of pre-curing in any particular case can be found by experiment since it is desirable to establish the lowest volatile content at which the resin will flow during the laminating procedure to give a laminate of, desirably, 45–65% of resin.

EXAMPLE 2

5.7 kg of water and 13.8 kg of 77% sulphuric acid and followed by 16.8 kg of paraformaldehyde '87' were charged into a 120 liter glass lined reactor which was provided with a thermostatically controlled oil jacket and stirrer adjusted to run at 75 rpm. When the mass temperature reached approximately 70° C the naphthalene charge (25 kg) was added and the temperture raised to 103° C and was held at this level for 6½ hours. Because of heat evolution in the initial stages of the reaction it was necessary to cool the oil jacket to 98°–100° C so as to maintain the mass at a temperature of 103° C.

At the end of the reaction the oil heater was switched off and 40–45 kg of toluene was added, with stirring, to dissolve the resin. Care was necessary at this state because of the vigorous refluxing by the toluene-water azeotrope. When the resin had completely dissolved, a surfactant was added and after stirring for a few minutes the layers were allowed to settle and the sulphuric acid was run off. To promote separation of the acid layer the contents of the reactor were held at 80°–85° C.

Following the discharge of the acid, the toluene solution of the resin was washed by stirring for a few minutes with 16 kg of water. When the stirrer was stopped the aqueous layer settled out and was run off. This process was repeated twice more, but in one case 0.15 kg of sodium carbonate was dissolved in the 16 kg of water and in the second wash 0.05 kg of sodium carbonate was employed. Thereafter, water washing was continued until the aqueous layer run off had pH of approximately 7.5.

At this stage the condenser was arranged for distillation and the mass temperature raised to 105°–110° C. The toluene was then distilled off, using steam at about 130° C, until the ratio of water to toluene in the distillate was 10:1. At this stage the distillation was discontinued and with the resin at 105°–110° C a suction of 25 cm Hg was applied for about 30 minutes to dry the resin. The resin was then discharged into aluminium trays.

The phenolation of NF resin was carried out as follows. 23.9 kg of phenol and 0.078 kg of p-toluene sulphonic acid were charged into a 120 liter glass-lined reactor at ambient temperature. Thereafter, the heaters were switched on and the stirrer was set running at 32 rpm.

The reactive NF resin solution (65 kg) prepared previously in the same reactor was contained in a drum fitted with a 1.9 cm diameter pipe leading into the top of the reactor. When the contents of the reactor had reached 90° C the tap was slightly opened and the addition of the NF resin solution was commenced. This solution was added over a period of 2 hours so as to control the rate of heat evolution and the extent of refluxing of the toluene-water azeotrope in the vertical condenser attached to the reactor. The mass temperature was held at 90°–95° C throughout this stage, the maximum temperature being controlled to some extent by the refluxing of the toluene/water azeotrope and this increased with the addition of the NF resin solution.

When the NF resin solution was all added to the reactor the mass temperature was reduced to 88°–90° C and the reaction continued for a further hour. Throughout this period there was vigorous refluxing of the toluene-water azeotrope which extended half way up the vertical condenser.

At the end of this period the condensing system was arranged for distillation and the mass temperature was raised to 100°–105° C. The toluene was then distilled off using steam at 120°–130° C. When the ratio of water to toluene in the distillate was 10:1 the distillation was discontinued and the phenolated naphthalene-formaldehyde resin produced was discharged from the reactor into aluminium lined trays.

The phenolated NF resin was then converted to a resol-type resin in the following manner. 18.2 kg of tar acid was charged into the 120 liter glass lined reactor and then 12 kg of naphthalene-formaldehyde-phenol resin, crushed to pass through a 1 cm mesh sieve, and this was followed by 2.6 kg of ammonia solution. The heaters were then switched on and stirring was commenced (75 rpm). When the mass temperature was 85°–90° C, 40% formalin (31.4 kg) was added. The reaction was mildly exothermic since the mass temperature rose from 80° to 90° C in about 15 minutes, despite the use of cooling water to lower the reactor jacket temperature to 90° C. Thereafter, the mass temperature was raised and the reaction ccontinued at 95° C until the viscosity of the resin changed appreciably. This stage was reached in about 1½ hours after the addition of the formalin. At this point 37.8 kg of methyl iso-butyl ketone was added to dissolve the resol-type resin; this addition was made cautiously owing to vigorous refluxing of the methyl isobutyl ketone. When solution was complete the stirrer was stopped and the aqueous layer separated out at the bottom of the reactor and was run off. The varnish was then discharged through a muslin filter into drums for storage before use as a laminating varnish.

We claim:

1. A thermosetting resol-type resin prepared by reacting a blend of a tar acid and a resinous reaction product with formaldehyde in the presence of ammonia, wherein the resinous reaction product is prepared by reacting an oxygen-containing naphthalene-formaldehyde resin with a phenol.

2. A resin as claimed in claim 1, wherein the naphthalene-formaldehyde resin has an oxygen content of from 4 to 16% by weight.

3. A resin as claimed in claim 1, wherein the phenol is phenol itself.

4. A resin as claimed in claim 1, wherein approximately equal amounts by weight of the phenol and the naphthalene-formaldehyde resin are reacted.

5. A resin as claimed in claim 1, wherein the reaction of the phenol with the naphthalene-formaldehyde resin is effected at from 80° to 100° C.

6. A resin as claimed in claim 1, wherein the tar acid has a boiling range of 185°–220° C.

7. A varnish comprising a resin as claimed in claim 1, in a solvent.

8. A varnish as claimed in claim 7, wherein the solvent is methyl isobutyl ketone.

9. A process for the production of a thermo-settting resol-type resin which comprises reacting a blend of a resinous reaction product of the reaction of an oxygen-containing naphthalene-formaldehyde resin with a phenol, and a tar acid with formaldehyde in the presence of ammonia.

10. A process as claimed in claim 9, wherein the formaldehyde is used in the form of formalin.

11. A process as claimed in claim 9, wherein the ratio by weight of tar acid to the resinous reaction product is from 1–3 to 1.

12. A process as claimed in claim 9, wherein the ammonia is used in aqueous solution.

13. A process as claimed in claim 9, wherein the tar acid has a boiling point in the range 185°–220° C.

14. A process as claimed in claim 9, wherein the resinous reaction product is the reaction product of a naphthalene-formaldehyde resin of 8 to 10 % oxygen content with phenol at a temperature of 80° to 100° C in the presence of p-toluene sulphonic acid as catalyst.

* * * * *